US011290319B2

(12) United States Patent
Lopez et al.

(10) Patent No.: US 11,290,319 B2
(45) Date of Patent: Mar. 29, 2022

(54) DYNAMIC DISTRIBUTION OF BIDIRECTIONAL FORWARDING DETECTION ECHO SESSIONS ACROSS A MULTI-PROCESSOR SYSTEM

(71) Applicant: HEWLETT PACKARD ENTERPRISE DEVELOPMENT LP, Houston, TX (US)

(72) Inventors: David Corrales Lopez, Heredia (CR); Andres Francisco Araya Rojas, Heredia (CR); Johan Martin Oviedo Paniagua, Heredia (CR); Daniel Canessa Valverde, Heredia (CR)

(73) Assignee: Hewlett Packard Enterprise Development LP, Houston, TX (US)

( * ) Notice: Subject to any disclaimer, the term of this patent is extended or adjusted under 35 U.S.C. 154(b) by 70 days.

(21) Appl. No.: 16/449,681

(22) Filed: Jun. 24, 2019

(65) Prior Publication Data
US 2020/0403848 A1  Dec. 24, 2020

(51) Int. Cl.
*H04L 41/0663* (2022.01)
*H04L 41/0668* (2022.01)
*H04L 43/10* (2022.01)

(52) U.S. Cl.
CPC .......... *H04L 41/0668* (2013.01); *H04L 43/10* (2013.01)

(58) Field of Classification Search
CPC ..... H04L 41/06; H04L 43/10; H04L 41/0663; H04L 43/0811; H04L 45/72; H04L 45/741; H04L 45/20; H04L 45/24; H04L 45/28; H04L 41/0668; H04L 12/28; H04L 12/56
See application file for complete search history.

(56) References Cited

U.S. PATENT DOCUMENTS

| 7,773,612 B2* | 8/2010 | Ke | H04L 45/22 370/401 |
| 7,813,263 B2* | 10/2010 | Chang | H04L 45/02 370/216 |
| 8,543,718 B2 | 9/2013 | Rahman et al. | |
| 8,868,731 B1* | 10/2014 | Tsai | H04L 12/462 709/224 |

(Continued)

OTHER PUBLICATIONS

Aldrin, S. et al., Seamless Bidirectional Forwarding Detection (BFD) Use Case Draft-IETF-BFD-Seamless-Use-Case-01, (Research Paper), Dec. 10, 2014, 9 Pgs.

*Primary Examiner* — Hanh N Nguyen
(74) *Attorney, Agent, or Firm* — Nolte Lackenbach Siegel

(57) ABSTRACT

A method and system of failure detection in a computer network, including pre-programming a number of processors of a multi-processor networked system coupled with remote systems via a network, each of the processors configured to run a BFD module. One processor may be assigned to be an active BFD server to establish sessions between the multi-processor networked system and the remote systems to detect link faults between the multi-processor networked system and the remote systems. Other processors may be assigned as dormant BFD clients. If a link or a processor running the active BFD server fails, one of the dormant BFD clients is selected to become an active BFD server. The BFD server may be dynamically replaced with a dormant client based on predetermined criteria without failure of the BFD server.

19 Claims, 6 Drawing Sheets

(56) References Cited

U.S. PATENT DOCUMENTS

| | | | |
|---|---|---|---|
| 2003/0208618 A1* | 11/2003 | Mor | H04L 45/00 709/238 |
| 2008/0005620 A1* | 1/2008 | Walker | G06F 11/0781 714/43 |
| 2010/0182927 A1* | 7/2010 | Han | H04L 69/16 370/252 |
| 2016/0020973 A1 | 1/2016 | Mishra et al. | |
| 2016/0197853 A1 | 7/2016 | Kumar et al. | |
| 2017/0195209 A1 | 7/2017 | Singh et al. | |
| 2018/0167262 A1* | 6/2018 | Devarajan | H04L 41/0668 |
| 2019/0363927 A1* | 11/2019 | Ganeriwal | H04L 43/0811 |

* cited by examiner

DYNAMIC DISTRIBUTION OF BIDIRECTIONAL FORWARDING DETECTION ECHO SESSIONS ACROSS A MULTI-PROCESSOR SYSTEM

BACKGROUND

Modern computer networks are generally designed to have redundancy at various levels to protect key or critical applications. Quick recovery from failures, such as link failures, is another way network designs protect such applications. Some network protocols and devices detect link failure by sending hardware detection signals, but other protocols do not have such mechanism. Instead, they depend on various "hello" mechanisms (exchange of communication signals and data packets to establish or verify a connection) of the protocol to detect link failures, which may take more than one second to detect the failure at protocol level. Other protocols have faster hello mechanisms but still take at least one second and may be protocol-dependent.

BRIEF DESCRIPTION OF THE DRAWINGS

The following detailed description references the drawings, wherein.

DETAILED DESCRIPTION

Figure 1:
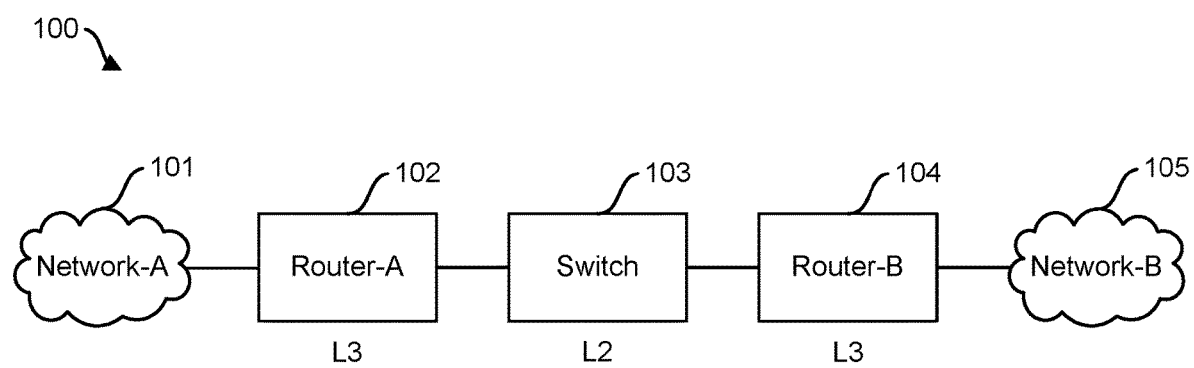
FIG. 1 shows an example network configuration with two routers and a bidirectional forwarding detection (BFD) module to detect link failure in accordance with one or more examples disclosed herein.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements may be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on. The terms "about" and "approximately", used interchangeably, mean up to 5% variation (plus or minus) from a given quantitative value following these terms. The term "adjacent," when applied to two components, regions, or layers, means no other components, regions, or layers, respectively, are physically interposed between the two components.

As disclosed herein, a functional module implementing the BFD protocol may be used to detect a network link failure, as described below in more detail. Briefly, the BFD protocol works based on a verification of connection between two network nodes or devices. If a network connection is not detected between the nodes, because no data is received in due time, then a failure is declared. This functional module may include hardware and/or software performing one or more specific functions of the BFD. A link is a connection between two network nodes at the physical and/or data link layer. A network node is a general term used to denote a system running a network software stack or the sending and/or receiving entity at a particular network layer. The BFD functional module may first establish a session between two network nodes, such as devices or computer systems, and then send echo packets to detect a failure in the link between the nodes. A failure is detected if the receiving node does not return the echo packet to the sending node.

In some applications, such as financial transactions or critical communications, or simply to improve quality and reliability of network services, quick recovery from link failures is highly desirable. Higher level protocols (with reference to OSI model) operate on longer time scales relative to lower level protocols. Hence, detection of failure by the protocols at higher levels is slower by nature. For example, one method of dealing with faulty or slow connections by high level protocols is to resend large application layer packets a number of times, which is time consuming, before it is determined that a failure has occurred. Hence, a delay of more than a few milliseconds in restoring a failed connection can significantly reduce the performance of higher level applications and protocols. In a layered architecture, it is inherently more efficient to use lower level (closer to physical and hardware layer) protocols to detect link failures.

BFD echo sessions are typically implemented in HW exclusively as they need fast transmission and/or processing times (for example, <5 ms). Echo packets have the same internet protocol (IP) address for their transmission source and destination (for example, source IP address=destination IP address=1.1.1.1.) Such packets are typically dropped (not processed) by operating system (OS) network stacks. As further described below, the hardware processor that executes the BFD echo sessions is commonly referred to as an operation, administration and maintenance processor (OAMP). On single-node devices (for example, single-ASIC hardware units that look like "pizza boxes") selection of an OAMP is not a matter of concern as any BFD echo session configured in a hardware device is unique to the hardware device and it will exist for as long as it is required by a client protocol (for example, the echo session will stay active from its creation until it is disabled/deleted).

In the case of multi-node devices, the previous conditions or assumptions do not hold. For example, on a hardware device with multiple line cards there is a choice as to where to execute the active BFD echo sessions (BFD server) since every line card may have at least one suitable OAMP. The same situation exists for hardware units, which use more than one application specific integrated circuit (ASIC) or node. In some implementations the control plane (further described below) decide on which node's OAMP all the BFD echo sessions will run (i.e., the BFD server). The algorithm may be to choose the lowest identifier (ID) available at the time of assignment, so for example, if a lower node ID is added to the system afterward an assignment, the BFD sessions will not migrate to it the new lower node ID.

In the scenario that the line card hosting of all the BFD sessions has failed, there exists a time window in which an indication or report of false positives (false link failures) may be generated while the BFD sessions are reassigned to new server nodes and OAMP. This may be called the false positives window. False positive detections may also create more network downtime, at least in some links or a subset of the network, due to unnecessary reconfiguration or re-convergence of nodes or network. To minimize these false positives, dormant BFD sessions may be pre-programmed in all line cards which are not servers, called BFD clients. Having the dormant BFD clients saves significant time, as measured in milliseconds, during this transition, however it may not eliminate false positively entirely. To further improve this solution, BFD echo sessions may be dynamically distributed between all nodes based on a given set of criteria, as described further herein. Generally, a combination of criteria may be used to distribute the BFD echo sessions amongst all available nodes, which can be changed dynamically as a response to network or system behavior. The objective is to reduce the potential number of BFD echo sessions affected by the false positives window. Such solutions and improvements may be vendor-agnostic and work for both in-house and original equipment manufacturer (OEM) ASICs and designs.

Some of the benefits that result from the solutions described herein include fewer false positives for customers that results less network re-convergence complaints and service level agreement (SLA) issues. Additionally, better utilization of existing hardware using these solutions may improve existing products, as this solution is not dependent on acquisition of more or new hardware. Furthermore, definition and enforcement of criteria for the dynamic distribution of BFD sessions (or election of new OAMP for BFD assignment), is easy to expand in the future. For example, network automation/assurance engines (NAE) results could be weighed as part of the distribution or election criteria.

Accordingly, a system and/or method of using BFD to reduce recovery time from a link failure is desirable. Even though BFD is protocol-independent and may be used at any layer, to increase efficiency and reduce failure detection and response time, it is often deployed at the third layer of the OSI reference model.

Examples disclosed herein describe a multi-processor system or node networked with other remote multi-processor systems (or nodes), each system or node having multiple communication line cards and each communication line card having multiple processors such as OAMP. The OAMPs may provide communication links with other remote multi-processor systems. Functional BFD modules may be deployed or preinstalled on one or more of the OAMPs on the communication line cards. One instance of the BFD module may function as a server, which actively monitors communication links for link failures, while other instances of the BFD module running on other OAMPs may function as clients, which lie dormant awaiting being promptly placed in the server mode in the event of failure of the presently functioning server. Having multiple OAMPs with preinstalled BFD modules in client mode reduces false positives of link fault/failure detection, in which a link fault is detected/declared where no fault exists.

In another example implementation, multiple BFD modules may be deployed in server mode, each monitoring a different set of communication links for failure. Other BFD modules are deployed in client mode to replace servers in case of server failures.

In still another example implementation, to further reduce failure detection time and false positives, server role from one OAMP may be dynamically reassigned to a dormant client based on various criteria and communication parameters. The dynamic reassignment of servers is done regardless of actual failures of servers operating at the time of reassignment. This reduces the probability or possibility of failure before it happens due to the criteria used for reassignment.

Turning now to the drawings, FIG. 1 shows an example network configuration 100 with two routers 102 and 104 and a BFD module to detect link failure. The configuration 100 may include a computer network-A 101, coupled with a router-A 102, which in turn is coupled with a switch 103, which is coupled with a router-B 104, which is coupled with computer network-B 105.

To send communication data (e.g., data and message packets used in various protocols like internet protocol (IP), between different computer networks, reliable communication links between the different computer networks are desirable. And in case of a link failure, it is highly desirable that such failures be detected quickly. As briefly noted above, the mechanism provided by the BFD module may be used to detect such failures quickly, for example, in less than 5 ms after the failure occurs.

The BFD module may be deployed at various OSI layers, such as layer 3 (L3), as a detection tool used by other L3 or higher level protocols, such as different interior gateway protocols (IGP) like open shortest path first (OSPF) and intermediate to intermediate system (IS-IS) protocols. IGPs are protocols that are used between interior nodes in a communication pathway, not including the initiating or first sending node and the final destination or last receiving node. That is, IGPs are not used for end-to-end points or nodes in a communication path, but rather for routing data between the interior nodes. BFD is protocol-agnostic and may be used by any of the communication protocols at the appropriate level, such as IP, token ring, and the like. Even though the higher level protocols like OSPF and IS-IS do not have knowledge of the details of BFD module's mechanisms, they can use facilities, such as application programming interface (API), to call various functions for use of the BFD module's services. In particular, these protocols may use the failure detection services of the BFD module. The BFD module may be integrated with other modules implementing the IGP or other protocols that want to use the BFD services. As such, IGP and BFD modules may be deployed together in the example network configuration 100.

With continued reference to FIG. 1, two counterpart BFD modules may be deployed, one at router-A 102 and another one at router-B 104. The two BFD modules communicate with each other by initially establishing a BFD session between them using BFD control packets, and then exchanging echo packets back and forth (an echo session). Exchange of BFD control packets, which are generally slower than echo packets, may continue after the establishment of the BFD session. If an echo packet sent by a sending BFD module is not echoed back to itself by the counterpart or peer BFD module within a predetermined timeout interval, then the sending BFD module declares the detection of a failure somewhere in a link between router-A 102 and router-B 104. The concept of layers discussed herein, is further described with respect to FIG. 2 below.

Figure 2:
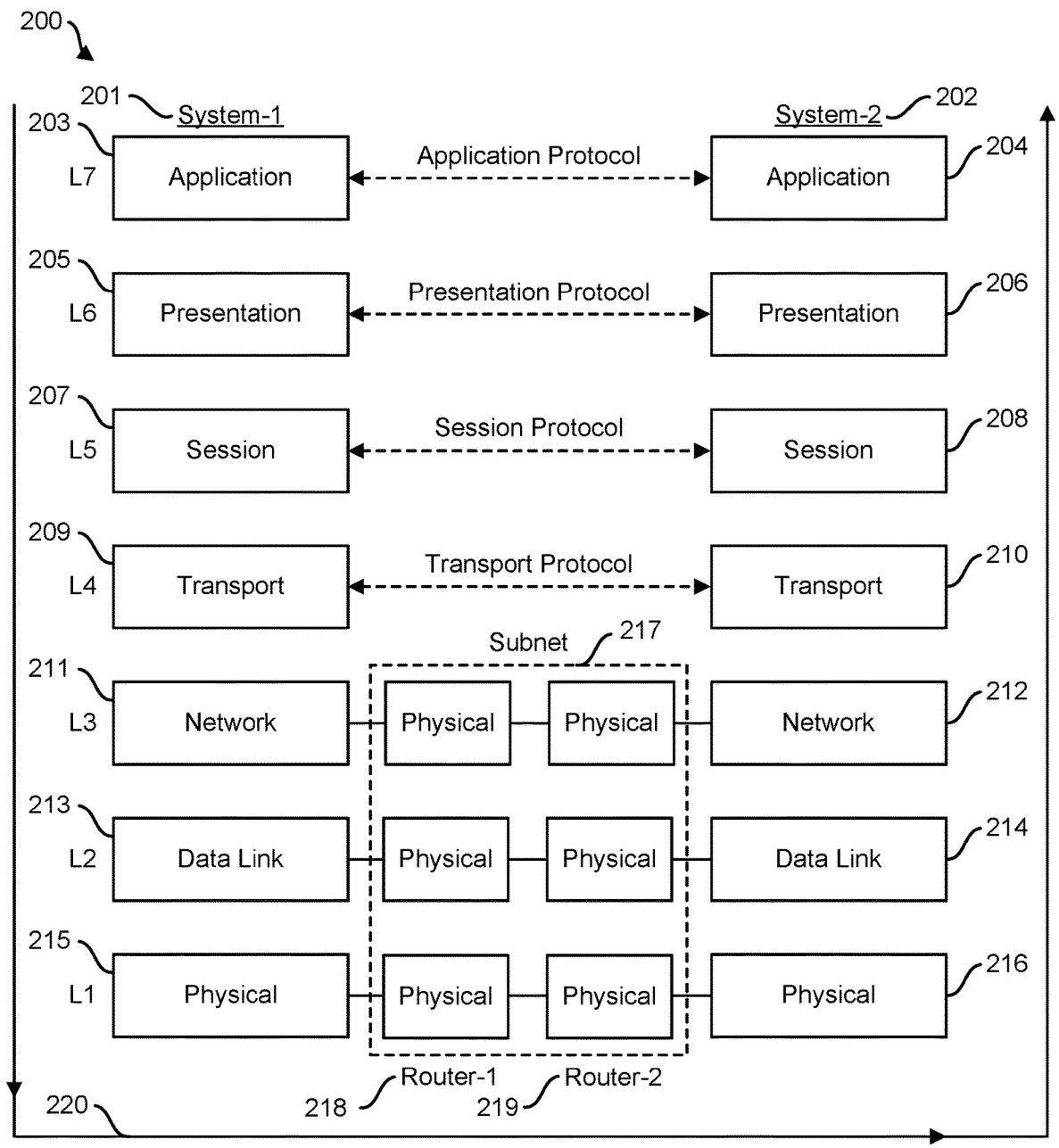
FIG. 2 shows an example representation of an International Standards Organization (OSI)—Open System Interconnect (OSI) reference network model in which context a BFD may operate at the network layers L2 and L3 shown in FIG. 1.

FIG. 2 shows an example representation 200 of International Standards Organization (ISO)—Open System Interconnect (OSI) reference network model in which context a BFD may operate at the network layers L2 and L3 shown in FIG. 1. The representation 200 includes a layered architecture including layers one to seven (L1 to L7). This network model is defined between two systems, system-1 201 and system-2 202, which communicate with each other at each distinct layer corresponding to the same layer in the other system, as signified by the dotted lines between the protocol layers. Specifically, layer 1 (L1), Physical layer 215, of system-1 201 communicates with its counterpart protocol physical layer 216 of system-2 202. Layer 2 (L2), Data Link layer 213, communicates with its counterpart protocol Data Link layer 214. Layer 3 (L3), Network layer 211, communicates with its counterpart protocol Network layer 212. Layer 4 (L4), Transport layer 209, communicates with its counterpart protocol Transport layer 210. Layer 5 (L5), Session layer 207, communicates with its counterpart protocol Session layer 208. Layer 6 (L6), Presentation layer 205, communicates with its counterpart protocol Presentation layer 206. Layer 7 (L7), Application layer 203, communicates with its counterpart protocol Application layer 204.

The three bottom layers L1-L3 constitute a subnet 217, which depends on physical devices within the subnet 217. The example implementations of BFD modules and protocol disclosed herein may often be deployed at L2 or L3 and so, are more closely related to the subnet 217 than other layers. As such, the BFD modules are more directly supported by hardware devices than higher level software modules. Router-1 218 and Router-2 219 operate at the subnet level. The Actual data flow follows the arrow line 220, flowing from the highest layer 203 (L7) in system-1 201 down to lowest layer 215 (L1), across the physical links, to lowest layer 216 (L1) up to the highest layer 204 (L7) of system-2 202. However, as noted above, each protocol layer in one system conducts a virtual communication with its corresponding protocol layer in the other system. In such virtual communications, the protocols communicating only understand their own data formats, syntax, and semantics.

Each of the layers L1-L7 described above has a distinct function in collaboration with other layers below and above it. The Physical layer, L1, maintains a physical connection and defines voltage levels, data rates, and signal encoding. The Data Link layer, L2, performs synchronization and error control for data packets. The Network layer, L3, is responsible for data routing, network control, and to assemble and disassemble higher level data packets. The other layers L4-L7 have higher level functions.

Figure 3:
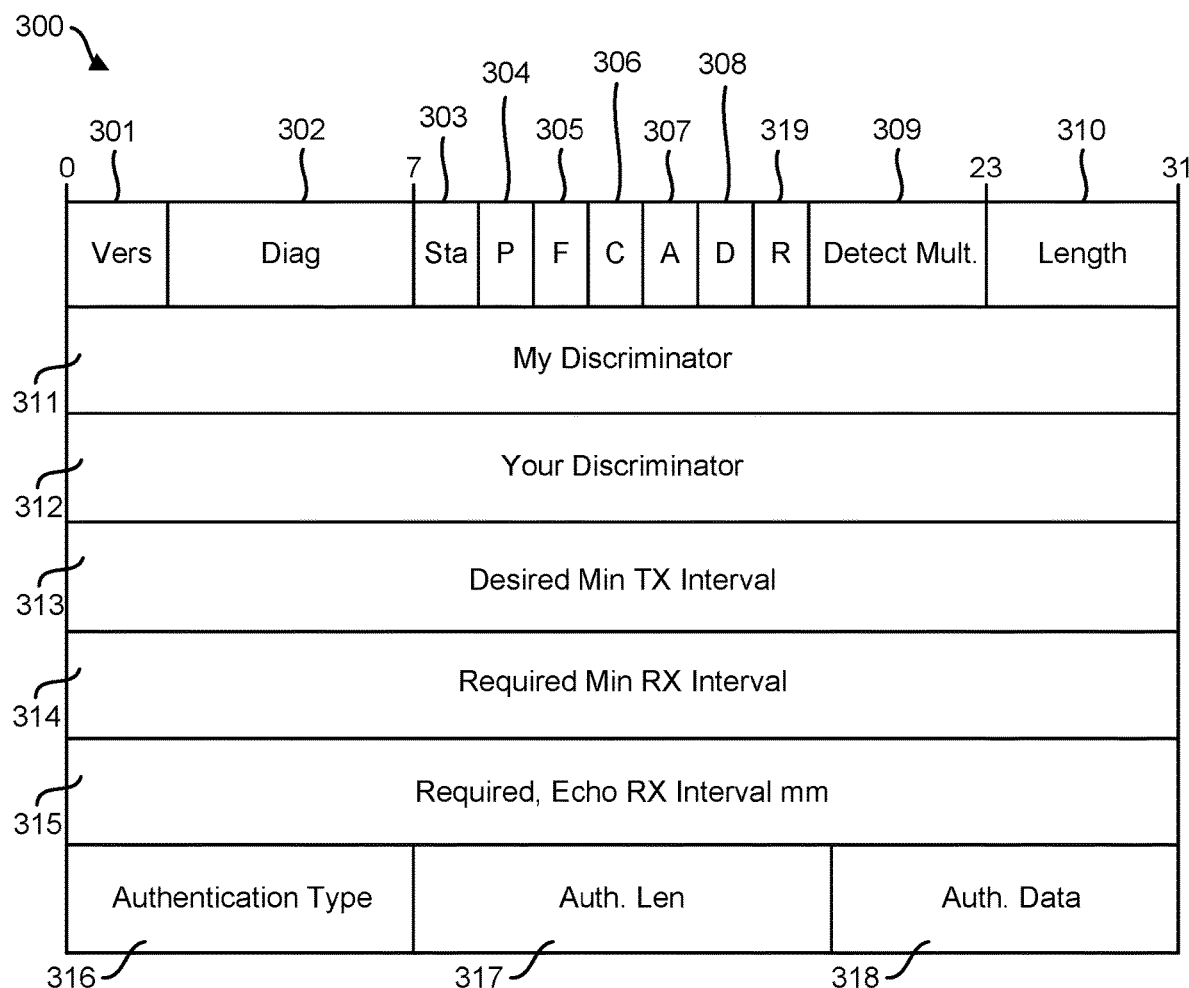
FIG. 3 show an example format of a BFD control packet used to establish a BFD session in a network arrangement similar to that shown in FIG. 1.

FIG. 3 show examples format of a BFD control packet 300 used to establish a BFD session in a network arrangement similar to that shown in FIG. 1. The BFD control packet 300 has various fields, each field having between one to 32 bits. The fields include Vers 301, Diag 302, Sta 303, P 304, F 305, C 306, A 307, D 308, M 319, Detect Mult. 309, and Length 310. Other fields include My Discriminator 311, Your Discriminator 312, Desired Min TX Interval 313, Required Min RX Interval 314, Required, Echo RX Interval mm 315, Auth. Type 316, Auth. Len 317, Auth. Data 318. In a BFD control packet 300, each field has a configuration to support the functions of the control packet 300.

The BFD control packets are used to establish a session between peer BFD modules that may be separated from each other by one hop or multiple hops. A hop is a distance between two adjacent layer 3 nodes with no other routing node between the two. The control packets may also be used to detect failure between remote nodes more than one hop away from each other.

BFD echo packets provide fault detection between two adjacent (single hop) nodes with or without the use of BFD control packets. The BFD echo packets have no defined format as they are returned by the receiving node without being processed, other than the standard layer 2 (L2) source media access control/destination media access control (SMAC/DMAC) rewriting.

Figure 4:
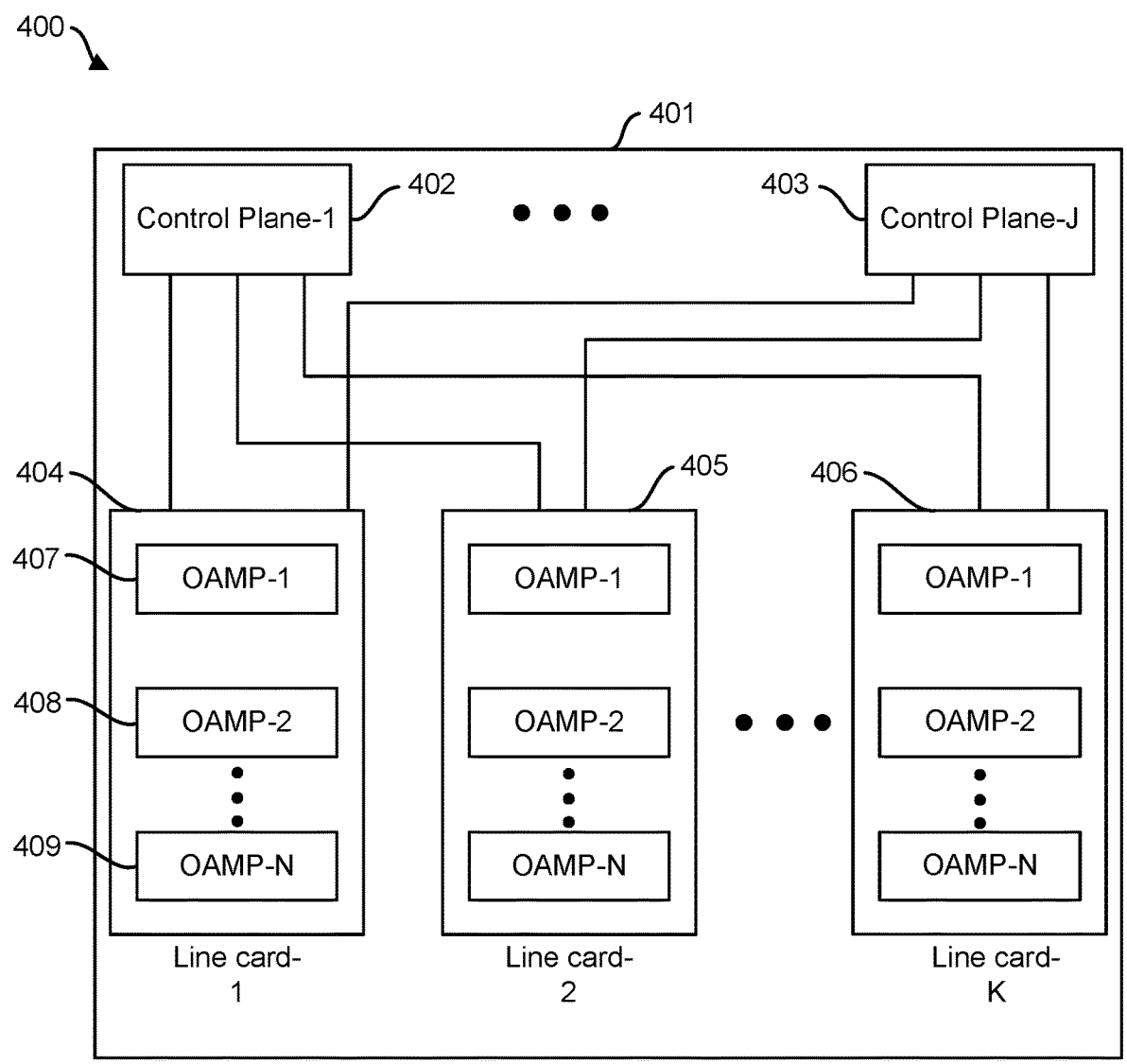
FIG. 4 shows an example node in a multi-node network arrangement in which a BFD module may operate to perform BFD.

FIG. 4 shows an example node 400 in a multi-node network arrangement in which a BFD module may operate to perform BFD. The node 400 includes a multi-processor system 401, which in turn includes one or control planes 402 to 403 (two shown), each control plane coupled with multiple subsystems or communication line cards 404, 405 and 406, each communication card including multiple processing units 407, 408 to 409. Node 400 shows an internal arrangement within which one or more BFD modules may be deployed to establish BFD sessions for the purpose of fault detection between different nodes. Different failure modes and how the disclosed BFD implementations detect them and reduce false positives are further described below with respect to the other figures showing the same basic internal node structure as node 400.

A subnet similar to the subnet 217 of FIG. 2, may be defined in terms of an architecture having three distinct planes, a Management plane, a Control plane and a Data plane. The Management plane includes tools for managing network infrastructure such as Simple Network Management Protocol (SNMP). The Control plane includes tools and protocols used for signaling between network entities to ascertain reachability and includes IGP, OSPF, OpenFlow and the like. The Data plane provides actual movement of data packets. The Management plane and the Control plane may be combined into one Control-Management plane. The control planes 402 and 403 control the management and assignment of BFD modules to various processing units 407-409. The Management plane, Control plane and Data plane may be implemented as a combination of hardware and software components that perform the aforementioned functions within the subnet.

The processing units 407-409 may be OAMP. The OAMPs may include memory, storage, input/output (I/O) ports, central processing unit (CPU) and other computing components needed to execute software, receive and send data, and perform other functions. The BFD module and other related modules, such as OSPF, may be assigned to, loaded onto, and executed on the OAMPs. Each of the communication line cards 404-406 may have one or more communication ports through which communication links are established for data transmission and BFD sessions.

Multiple communication links and ports from one or more communication line cards 404-406 may be aggregated into one unit creating a link aggregation group (LAG).

Figure 5:
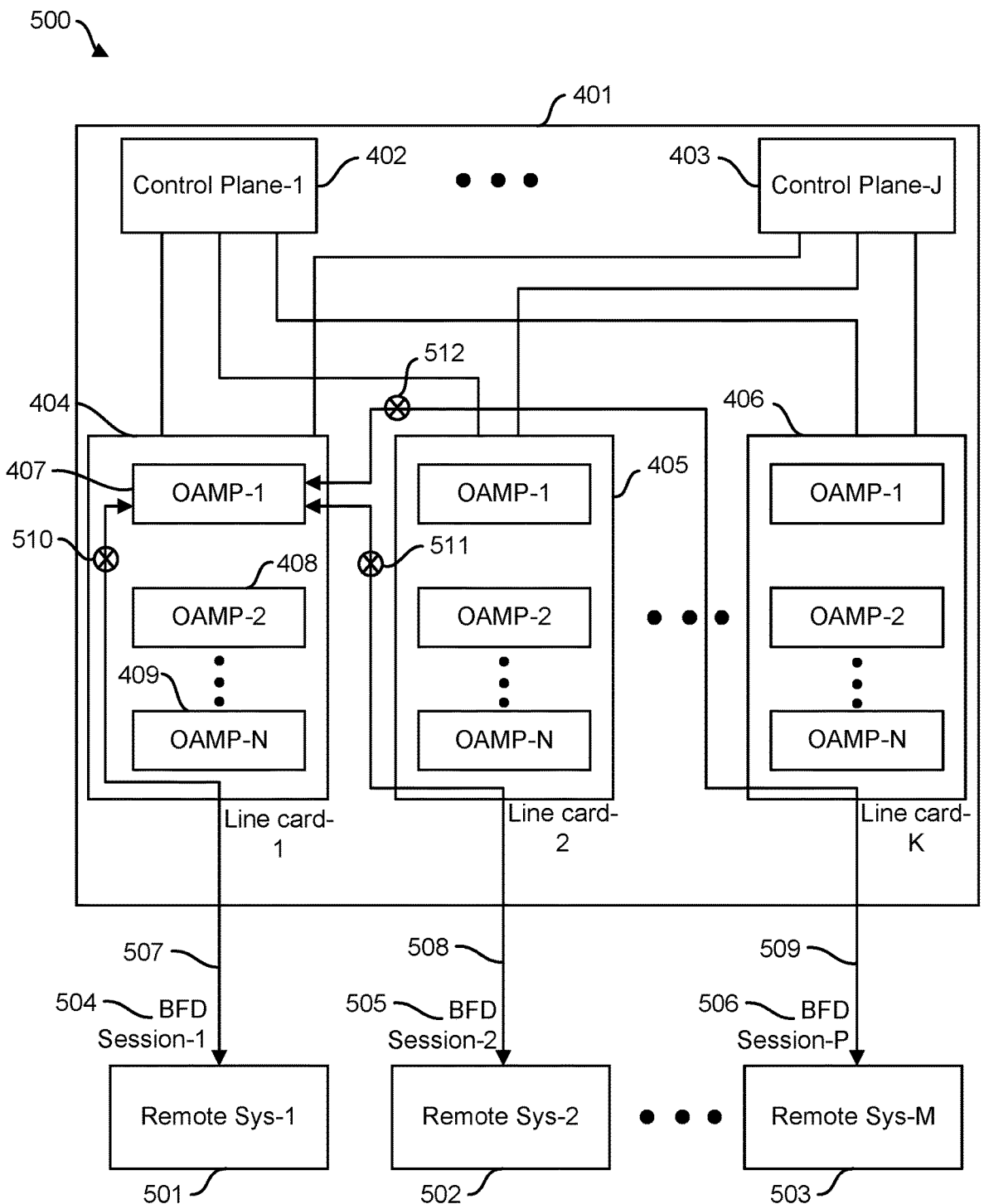
FIG. 5 shows an example node failure in a multi-node network similar to the network arrangement of FIG. 4.

FIG. 5 shows an example node failure in a multi-node network 500 similar to the network arrangement of FIG. 4. Multi-node network 500 includes a node comprising a multi-processor system 401, which in turn includes one or control planes 402 and 403 (two shown), each control plane coupled with multiple subsystems or communication line cards 404, 405 and 406, each communication line card including multiple processing units 407, 408 and 409. The system 401 may be in communication with other similarly structured remote systems 501, 502 and 503 via the communication line cards 404-406. A processing unit 407 may be coupled with remote systems 501-503 via links 507, 508, and 509. BFD sessions 504, 505, and 506 may be established over links 507-509. Failures 510, 511, and 512 may occur in one or more of the links 507-509, respectively. The links 507-509 may further go through LAG units.

In some example implementations, the processing unit 407 may run a partial communication stack for the subnet 217 (see FIG. 2) in accordance with the ISO-OSI network model. The partial communication stack may include the lower layers L1-L3 and include IGPs, such as OSPF, and also a BFD module.

In operation, the BFD module assigned to and loaded in the processing unit 407 may establish a session between multi-processor system 401 and peer BFD modules on one or more of the remote systems 501-503. The BFD module on processing unit 407 may then start sending echo packets to its peers in the remote systems 501-503. In normal operation, the peer BFD modules will send back the echo packets within a predefined timeout interval. However, if one of the links 507-509 fails, the BFD module on processing unit 407 will detect the failure in the particular link and report it back to the higher level protocols like the OSPF. This is because the echo packets were not returned by the peer BFD modules within the timeout interval.

Now, if the processing unit 407 itself fails, the failure may be detected as the failure of all the links between the multi-processor system 401 and peer remote systems 501-503, even though the links may be operational and not failed. These are false positives, indicating a failure in one or more links where there are none.

In an example implementation, the control planes 402 and 403 load BFD modules onto multiple processing units 407-409 on multiple communication line cards 404-406. One of the processing units 407-409 running a BFD module is designated a server (BFD server or sever) and the BFD module is placed in server mode to actively execute the BFD actions such as establishing sessions with remote peer BFD modules and sending and receiving echo packets. The other processing units running other BFD modules are designated as clients (BFD Client or client) and the corresponding BFD modules will be placed in client mode and stay dormant until needed. In the case of the failure of the server (the processing unit associated with the BFD module running in server mode, or server BFD), the control planes 402 and 403 will quickly switch the server by designating as the new server another processing unit and its corresponding BFD module, which is in client mode. This technique saves time and reduces network transmission delays and latency by quickly substituting a dormant but ready BFD module for a failed one. If no dormant client BFD modules are available, the quick switch-over and replacement of a failed server will not be possible.

In some example implementations, the BFD server and BFD client modules are deployed within the same communication line card, such as one of the communication line cards 404-406, while in other example implementations the server and clients may be deployed on different and/or multiple communication line cards 404-406.

To further reduce the possibility of false positives and the possibility of link failures, the server may be dynamically changed from a current processing unit to another one to replace the current server with a dormant client. The dynamic change may be done in absence of any failure based on various parameters and behaviors. These parameters and behaviors include having at least one active port in an LAG or communication line card, having the most number of ports in the LAG or communication line card, having processing units with sufficient capacity to run BFD module, a communication line card having the longest time since its most recent failure or hot swap operation, a communication line card having the least congestion and latency, a communication line card with fewest echo failure sessions, a communication line card with the least data traffic, distance between nodes, frequency of configuration of a communication line card, and the like. Those skilled in the art will appreciate that many other behaviors and parameters may be used as criteria to dynamically change servers and replace them with dormant clients.

Figure 6:
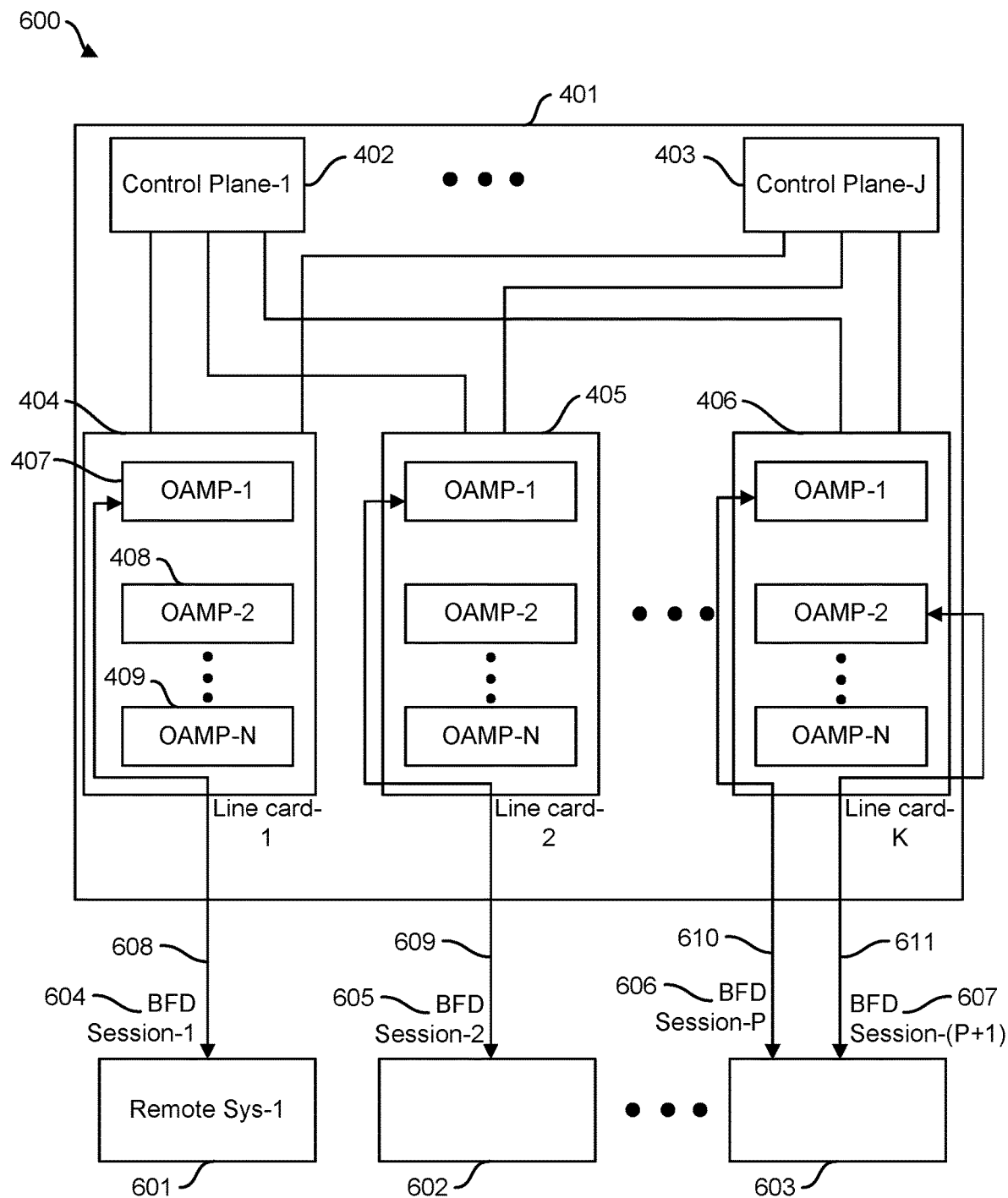
FIG. 6 shows an example of multiple BFD servers in a multi-node network similar to the network arrangement of FIG. 4.

FIG. 6 shows an example of multiple BFD servers in a multi-node network 600 similar to the network arrangement of FIG. 4. The multi-node network 600 is similar to the multi-node network 500 described with respect to FIG. 5, and includes a multi-processor system 401, which in turn includes one or more control planes 402 and 403 (two shown), each control plane coupled with multiple subsystems or communication line cards 404, 405 and 406, each communication line card including multiple processing units 407, 408 and 409. The multi-processor system 401 may be in communication with other similarly structured remote systems 601, 602 and 603 via the communication line cards 404-406. A processing unit 407 may be coupled with remote system 601 via link 608. Similarly, other BFD modules may be deployed on other processors within the communication line cards 405 and 406, which are coupled with remoted systems 605 and 606 via links 609-611, respectively. BFD sessions 604, 605, 606, and 607 may be established over links 608-611 by the respective BFD modules.

In some example implementations, the processing units 407-409 within communication line cards 404-406 may run a partial communication stack for the subnet 217 (see FIG. 2) in accordance with the ISO-OSI network model. The partial communication stack may include the lower layers L1-L3 and include IGPs like OSPF and also a BFD module.

In some example implementations, several of the multiple BFD modules deployed on the communication line cards 404-406 may be designated as servers and be placed in server mode for active operation. Each such server is coupled with one or more remote systems. The rest of the multiple BFD modules may be placed in client mode. In this implementation, a failure of one processing unit within one of the communication line cards may significantly decrease the number of false positives because not all BFD sessions are associated with the failed processing unit. Such decrease in the number of false positives is proportional to the number of BFD sessions associate with each processing unit or OAMP.

In addition to using multiple servers deployed within multiple communication line cards, dynamic substitution of clients for servers based on the aforementioned criteria may be used as well.

The foregoing disclosure describes a number of example implementations of BFD sessions for accurate link failure detection and reduction of false positives. For purposes of explanation, certain examples are described with reference to the components illustrated in FIGS. 1-6. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method of reducing false positive in failure detection in a computer network, the method comprising:
   pre-programming a plurality of processors of a multi-processor networked node coupled with remote nodes via a network, each of the plurality of processors to perform bidirectional forwarding detection (BFD) operations;
   assigning one processor of the plurality of processors to be an active BFD server, wherein the active BFD server establishes sessions between the multi-processor networked node and the remote nodes to detect link faults between the multi-processor networked node and the remote nodes;
   assigning the remaining processors of the plurality of processors to be dormant BFD clients;
   determining, among a plurality of line cards associated with the dormant BFD clients, a line card having a least number of echo failure sessions; and
   selecting a dormant BFD client on the determined line card to replace the active BFD server to reduce a false positive time window during which false failure detections are indicated.

2. The method of claim 1, further comprising sending an echo packet from the active BFD server to at least one of the remote nodes.

3. The method of claim 2, further comprising receiving the echo packet back from the at least one of the remote nodes within a predetermined timeout interval.

4. The method of claim 1, wherein the plurality of the processors include operation, administration, and maintenance processors (OAMPs).

5. The method of claim 1, wherein the BFD operations implement an interior gateway protocol (IGP).

6. The method of claim 1, wherein the BFD operations include a timeout interval of less than 5 milliseconds.

7. The method of claim 1, further comprising determining, among the plurality of line cards, a second line card having one or more of:
   at least one active port;
   a most number of ports; and
   least data traffic.

8. A network link fault detection system comprising:
   a plurality of network subnet control planes deployed within a networked node;
   a plurality of communication line cards coupled with the plurality of the network subnet control planes, each communication line card having a plurality of processing units;
   wherein a subset of the plurality of processing units are capable of performing bidirectional failure detection (BFD) operations, wherein one of the plurality of the processing units is a BFD server, wherein remaining processing units of the subset of the plurality of the processing units are BFD clients, wherein the control planes are configured to:
      determine, among the plurality of communication line cards, a communication line card having a least number of echo failure sessions; and
      select a BFD client on the determined communication line card to replace the BFD server to reduce a false positive time window during which false failure detections are indicated.

9. The network link fault detection system of claim 8, further comprising a control plane in communication with the communication line cards.

10. The network link fault detection system of claim 8, further comprising an open shortest path first (OSPF) module integrated with the BFD module.

11. The network link fault detection system of claim 8, wherein the BFD server is deployed to establish at least one session with a remote networked node to perform a BFD operation.

12. The network link fault detection system of claim 11, wherein the BFD server detects link failure based on a timeout interval within which BFD echo or BFD control packets are returned while performing the BFD operation.

13. The network link fault detection system of claim 12, wherein the control planes are further configured to assign a BFD client to become the BFD server upon detection of a failure of the BFD server.

14. A method of link fault correction, the method comprising:
   pre-programming a plurality of processors of a multi-processor networked node coupled with remote nodes via a network, a subset of the plurality of processors to perform a bidirectional forwarding detection (BFD) operation;
   assigning a subset of the plurality of processors to be active BFD servers, wherein the active BFD servers establish sessions between the multi-processor networked node and the remote nodes to detect link faults between the multi-processor networked node and the remote nodes;
   assigning the remaining processors of the plurality of processors to be dormant BFD clients;
   determining, among a plurality of line cards associated with the dormant BFD clients, a line card having a least number of echo failure sessions; and
   selecting a dormant BFD client on the determined line card to replace an active BFD server.

15. The method of link fault correction of claim 14, wherein each communication line card includes a plurality of processors.

16. The method of link fault correction of claim 14, further comprising sending BFD echo or BFD control packets by the active BFD servers to peer BFD servers in the remote nodes.

17. The method of link fault correction of claim 14, wherein assigning some of the plurality of processors to be active BFD servers comprises assigning some of the plurality of processors to be active BFD servers by at least one of a plurality of control planes deployed within the multi-processor networked node.

18. The method of link fault correction of claim 14, further comprising dynamically replacing multiple active BFD servers with multiple dormant BFD clients.

19. The method of link fault correction of claim 14, further comprising determining, among the plurality of line cards, a second line card having one or more of:
- processing units with sufficient capacity to perform a BFD operation;
- longest time since its most recent failure; and
- least congestion and latency.

* * * * *